Patented Mar. 24, 1942

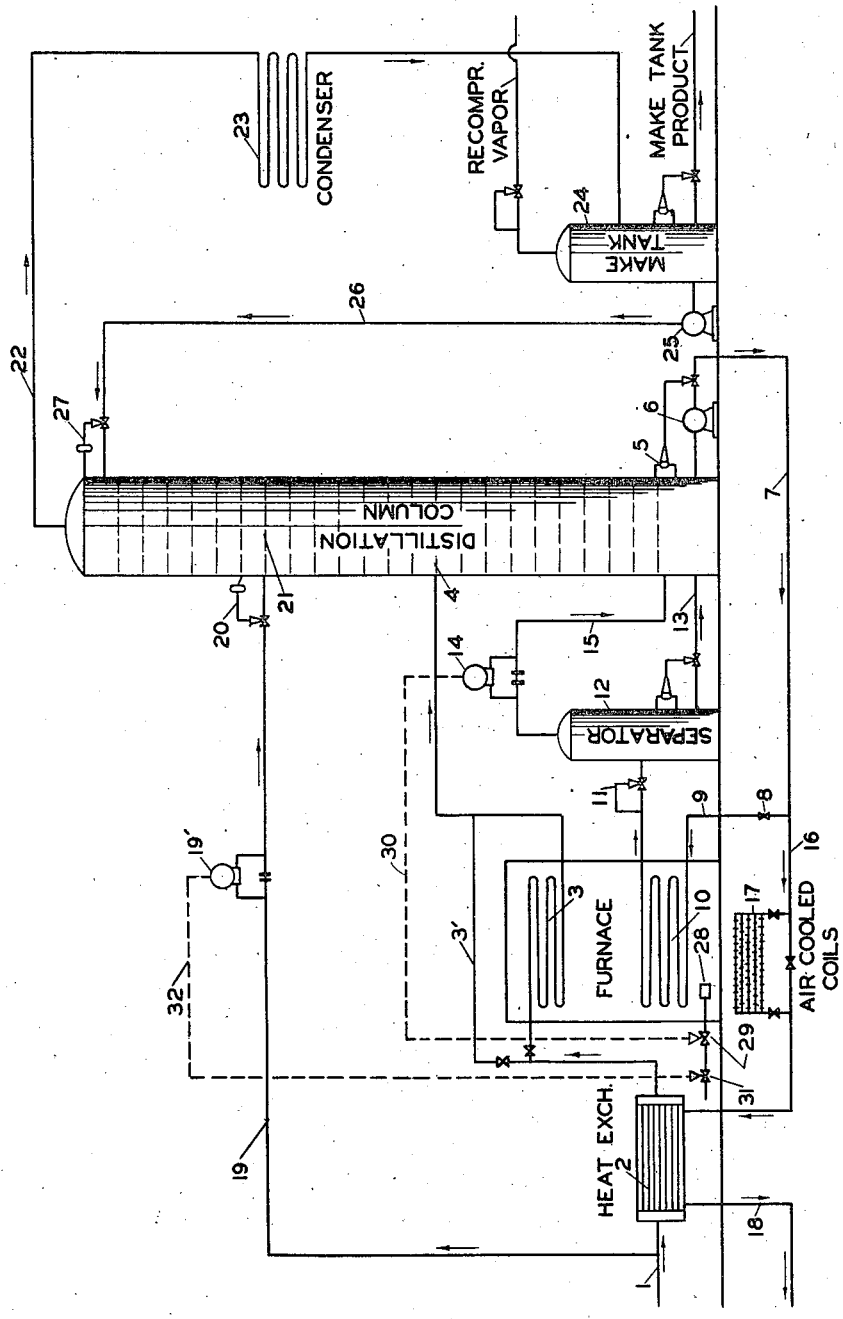

2,277,070

UNITED STATES PATENT OFFICE 2,277,070

METHOD OF SEPARATING LIQUIDS AND GASES

Samuel C. Carney, Bartlesville, Okla., assignor to Phillips Petroleum Company, a corporation of Delaware Application April 28, 1939, Serial No. 270,683

2 Claims. (Cl. 196—8)

This invention relates to the separation of a light fraction and a heavy fraction which are in solution and more particularly is concerned with the distillation of rich absorption oil using heat applied in a direct fired pipe still.

In the petroleum industry among others it is often desirable to separate multicomponent solutions into light and heavy fractions. An example of this problem is the distillation of natural gasoline from the absorbent in natural gasoline absorption plants.

Heretofore in the separation of the gasoline content from the absorbent menstruum, it has been customary to employ a steam still. The usual procedure has been to discharge the rich absorption oil containing the absorbed desirable constituents into a steam still in which the charged oil is subjected to the action of steam which heats the oil and removes the gasoline as vapor. The steam and gasoline vapor are carried over from the still through a suitable condenser in which the steam and gasoline vapor are liquefied, the separation of the liquid gasoline from the water being thereafter easily effected. The oil from which the gasoline constituents have been separated is drawn off to be used again. The employment of steam necessitates constant supervision by one or more operatives and the process although generally satisfactory in other respects, is expensive.

Thus, the primary object of the present invention is to provide an improved method and apparatus for the separation of the gasoline constituents or other condensable vapors from the charged oil, to the end that the process may be carried out more advantageously and economically.

A further object of the present invention is to provide an improved method and apparatus operating in a continuous, automatic or self-controlled manner, thus eliminating constant attention of an operator.

Other objects and advantages of the present invention, of utilizing a direct method of heat application in place of the conventional steam application, consist of: elimination of boiler installation; sending fuel gas to the still in a small line without losses, instead of steam in a large line with losses; since no steam is used, the condensate return system is eliminated; in the absence of steam, emulsification, corrosion and freezing in winter are minimized; and since the condensing load is tremendously reduced, the sizes of cooling tower and cooling coils are reduced, these units being second only to boiler house in high maintenance cost.

Other objects and advantages will appear from the more detailed description of the invention following hereinafter.

The accompanying drawing is a diagrammatic elevation of an apparatus suitable for carrying out the present invention.

Referring to the drawing in detail, the rich absorption oil coming from an absorber (not shown) flows through a pipe 1, entering a feed plate 4 of a distillation column, after having passed through a heat exchanger 2 and a preheating coil 3, in which the rich oil is heated to a temperature somewhat below the boiling point of the lean solvent alone at the operating pressure as will later be described. A by-pass pipe 3' is shown for coil 3.

Heated oil flows downward over the plates of the exhausting section below the feed plate 4. A pool of oil collects in the base of the column from whence oil is controllably delivered by action of a liquid level control 5 into a pump 6. The pump 6 delivers the oil into a pipe 7. A portion of the oil stream is diverted through a pipe 9 having a valve 8 leading to a direct fire heated coil 10 by means of which the requisite amount of heat for operation of the exhausting section of the column is added, the heated oil being delivered through a constant flow valve 11 into a separator 12. In the separator, operating at column pressure, the vapor and liquid are separated, the liquid flowing through a level controlled valved pipe 13 back to the base of the column. The vapors are metered by any suitable metering device such as an orifice meter 14 and returned through a pipe 15 to the base of the column. Oil which has not passed through the valve 8 goes by a pipe 16, optionally through an air cooled section 17 contacted by a stream of air, to the hot side of the heat exchanger 2 and thence by a pipe 18 to further cooling apparatus (not shown) and back to the absorber.

A relatively small part of the original cold rich oil does not follow the above-described course, but flows by a pipe 19 having an orifice meter 19', in an amount as controlled by a thermostatic valve 20, and enters the column at a secondary feed plate 21 located at a point in the column below the top plate but above the primary feed plate 4. Vapors of gasoline product leave the top of the column by a pipe 22 and are partly condensed in a condenser 23. The condensate is collected in a tank 24, and a part of the condensate as governed by a thermostatic valve 27 is delivered by a pump 25 through a pipe 26 to the top plate of the column as reflux.

A gas burner 28 is shown for heating coils 3 and 10 and the supply of fuel is controlled by valve 29 having actuating connection 30 with meter 14.

It should be mentioned that the single pump 6 is shown for the sake of simplicity, though in most cases a separate pump would be preferable on that part of the cycle passing through heating coil 10. The purpose of separating tank 12 is to permit continuous measurement of the vapor, as distinguished from the heated liquid returning to the base of the column, and any equivalent method of continuously measuring this vapor may be used.

The most important single point of operation lies in the method of control of the greater part of the developed heat. In fact, it is sound in principle and practice to eliminate the heating coil 3 adding to the column at the feed plate 4 only recovered heat from the heat exchanger 2, thus adding all the developed heat to the base of the column by evaporating oil on the way out. Heating the base by a coil such as 10 is known in the art, but in all cases where this method is used, heat is applied so as to cause a certain desired temperature of the liquid at the base of the column.

It cannot be too strongly emphasized that the only temperature at the base of the column which will permit the entire solvent oil fraction to pass out therefrom, is the boiling point temperature of the solvent at the pressure at that point, and furthermore that this necessary temperature is independent of the amount of heat which has been added. No idea is more firmly fixed in the minds of operators in general, than the erroneous one that a higher temperature means that more heat has been used. Even many people who can explain in words the difference between latent heat and sensible heat, still try to detect or even to measure latent heat with a thermometer.

In this process, temperature at the base of the column is of course what the laws of physics compels it to be. But since the significant heat is the latent heat required to accomplish the exhausting of the product, the amount of latent heat added is measured by measuring at the meter 14, the amount of vapor which is sent up through the plates of the exhausting section. The differential pressure across meter 14 may be used to automatically control the fuel gas burned under heating coil 10, thus making automatically constant the flow of vapor.

It is also true that the entire solvent oil will not flow out of the base of the column unless this exhausting vapor is condensed and returned. A large amount of exhausting vapor is required and by reason of its composition it is generated and delivered at a temperature much higher than that of steam when similarly used. It is very burdensome on the reflux cooling system if all this latent heat has to be removed as sensible heat at the relatively low temperature of the product condenser.

As has been stated, however, reflux is minimized if feed be delivered to the feed plate below its boiling point. So in this process, feed is delivered to plate 4 at a temperature somewhat below the boiling point of the stripped solvent at the pressure present. It is at its boiling point as a solution but is still able to receive from the exhausting vapors both latent heat for the evaporation of its solute and sensible heat for heating of its heavier constituents. The proper temperature at plate 4 will thus depend on the composition of the solvent and the operating pressure.

The capacity of the feed delivered at plate 4 to absorb heat should be only enough to permit it to receive and transform a major portion, for example ¾, of the latent heat of the exhausting vapors. But, for example, if ⅓ the solvent be evaporated at the base, the entire solvent will be able to receive all that latent heat as sensible heat if the feed enters at a temperature about 100° F. lower than the boiling point of the pure solvent. Thus, the temperature at plate 4 should be about the same as that on the feed plate at the top of the steaming columns ordinarily used if operating at similar pressure.

At such a temperature, a part of the solvent vapor introduced at the base, will pass above feed plate 4 and by ordinary operating variables, this will be a reasonable varying amount. In order to still further reduce the amount of reflux required at the low temperature of the top plate, there is introduced at a still higher plate, numbered 21 on the drawing, a small and automatically variable amount of cold rich oil entering through the thermostatic valve 20.

Temperature is a sound control method here and at the top plate, for it indicates the composition. It is also sound in the feed pipe entering at plate 4, for there, chiefly, sensible heat is to be indicated. The temperature at plate 21 is so adjusted as to indicate the presence there of a vapor consisting, for example, of 90% gasoline product and 10% solvent. The cold rich oil entering here may be considered as a second feed, as a reflux or as a solvent whose duty it is to dissolve vapors of the solvent rising from plate 4. In whichever way it is considered it cannot be used in refinery operations because of the taking of side cuts. But one pound entering here cold will dissolve about three pounds of solvent vapors from below. The vapors rising from plate 21, containing a high concentration of gasoline product, are refluxed in the conventional manner with condensed product entering through the thermostatic valve 27.

The liquid flowing down from plate 21 is of course not that which enters there. As it receives heat from below, its lighter gasoline content will be driven off and there will be added to it some heavier gasoline from the reflux supplied at the top plate, and the downflow, depending on conditions of operation, may result in a higher concentration of gasoline at plate 4 than that contained in the original feed, but exhausting is independent of the concentration entering the exhausting column. In general, the column is an orthodox column as known in the art having two feeds, but with the important exception, not known or used in the prior art, that the two feeds are of the same composition but are introduced at different temperatures.

There are also some finer points of operating adjustments which do not affect the principles of the present invention. Obviously, if the temperature of the feed entering plate 4 be lower, more exhausting vapor must enter at the base. Since it is desirable that exhausting vapor flow be held constant as the flow of rich feed is constant, a minimum temperature of oil entering at plate 4 should be maintained. Also, if the temperature of the feed entering plate 4 were to rise, a larger flow of oil to plate 21 would be required, and vice versa. It is appreciated that the flow of cold oil through pipe 19 may be used to regulate inversely the flow of fuel gas for heating the coil 3 by means of a valve 31 controlled at 32 by meter 19'.

Other things being equal, it is more economical in a modern pipe furnace to deliver heat for evaporation of the relatively light solvent than for mere additional heating from the heat exchange temperature. Therefore, the heat load should be given chiefly to coil 10 rather than to coil 3. Also the diversion of cold oil through pipe 19 unbalances the heat exchange cycle, there being a larger amount of hot oil than of cold entering the heat exchanger 2. This unbalance may be corrected, if desired, by use of a finned air cooler 17 which is quite effective at such temperatures. This will relieve load on final water cooler, of course at the expense of extra heat required at coil 3.

A further item concerns the amount of oil flowing to heating coil 10 as controlled by valve 8. So far as the principles of distillation are concerned, no difference will result in the temperature at the base of the column whether a large amount flows through valve 8 with a relatively small percent of it vaporized in separator 12, or a small amount through valve 8 with a larger percent vaporized; for one cannot heat a liquid above its boiling point by use of its own saturated vapor. And if the mols introduced are of heavier vapor, they will the more readily condense, evaporating in the column an equivalent of lighter vapor, whereas if the mols introduced are of lighter vapor they will go further up the plates themselves. The amount through valve 8 should therefore be determined by consideration of the mechanical factors of pumping cost and the characteristics of heating coil 10, and then left constant so that the factors of temperature and density will be constant at the meter 14.

While I have described my invention as applied to the distillation of rich absorption oil, it will be apparent that it is equally applicable to any distillation problem wherein a light fraction is to be separated from a heavy fraction.

The terms "vapors" and "gases" are used interchangeably in this disclosure and when the term "liquid" is used, it describes the condition at the pressure and temperature present.

I claim:

1. The process of removing the desirable constituents from an enriched absorption oil which comprises heating the enriched absorption oil to the desired temperature in a fire still, passing the enriched absorption oil to the feed zone of a distillation column from which the desired product is taken off as a vapor, condensing said vapor and returning a part of the same as reflux, passing the denuded absorption oil from the distillation zone back to the absorber, diverting a portion of the denuded absorption oil to a heater to vaporize a part of the same, passing the unvaporized liquid and a controlled amount of vapor back to the distillation zone and contacting the enriched absorption oil in the distillation zone with the proper amount of vapor to separate the desired constituents from the absorption oil.

2. The process of removing the desirable constituents from an enriched absorption oil which comprises heating the enriched absorption oil to the desired temperature in a fire still, passing the enriched absorption oil to the feed zone of a distillation column from which the desired product is taken off as a vapor, condensing said vapor and returning a part of the same as reflux, passing the denuded absorption oil from the distillation zone back to the absorber, diverting a portion of the denuded absorption oil to a heater to vaporize a part of the same, passing the unvaporized liquid and a controlled amount of vapor back to the distillation zone, and entering cold enriched absorption oil into the distillation zone above the feed zone and below the reflux entrance to condense absorption oil vapors rising in the column to prevent their going overhead with the desired products.

SAMUEL C. CARNEY.